(12) United States Patent
Suzuki

(10) Patent No.: US 7,511,897 B2
(45) Date of Patent: Mar. 31, 2009

(54) PROJECTOR OPTICAL SYSTEM

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 65 days.

(21) Appl. No.: 11/778,554

(22) Filed: Jul. 16, 2007

(65) Prior Publication Data

US 2008/0019001 A1 Jan. 24, 2008

(30) Foreign Application Priority Data

Jul. 19, 2006 (JP) ............................. 2006-196567

(51) Int. Cl.
*G02B 9/00* (2006.01)
*G02B 3/00* (2006.01)

(52) U.S. Cl. ...................... 359/754; 359/649

(58) Field of Classification Search ................ 359/566, 359/569, 570, 576, 649, 650, 651, 654, 796, 359/797, 800

See application file for complete search history.

(56) References Cited

U.S. PATENT DOCUMENTS

| 5,703,721 | A | 12/1997 | Bietry et al. |
| 5,969,875 | A | 10/1999 | Sugawara |
| 6,831,783 | B2 * | 12/2004 | Hoshi ......................... 359/569 |
| 2008/0180804 | A1 * | 7/2008 | Suzuki ........................ 359/649 |

FOREIGN PATENT DOCUMENTS

| JP | 2004-279958 | 10/2004 |
| JP | 2004-279958 A | 10/2004 |
| JP | 2005-301110 | 10/2005 |
| JP | 2007-171547 | 5/2007 |

* cited by examiner

*Primary Examiner*—David N Spector
(74) *Attorney, Agent, or Firm*—Miles & Stockbridge P.C.

(57) ABSTRACT

A projector optical system for forming a real image by projecting an image of a display element is constituted by, sequentially from a projection side, an aperture diaphragm; and a first lens group having positive refractive power and having, in the interior thereof or on a lens surface at a projection side or at a display element side, a diffraction optical surface formed by a multilayer-type diffractive optical element in which diffraction gratings formed on two diffractive element components are arranged facing each other. The projector optical system is configured so as to satisfy the following expression $$0.1 < K/L < 1.5$$

wherein L is a total length on an optical axis, and K is a distance on the optical axis from the aperture diaphragm to a surface of the first lens group that is closest to the projection side, and satisfy also the following expression $$0.01 < \Delta Nd < 0.45$$

wherein $\Delta Nd$ is a difference between refractive indices of the two diffractive element components for a main wavelength (d-line).

11 Claims, 6 Drawing Sheets

PROJECTOR OPTICAL SYSTEM

INCORPORATION BY REFERENCE

This invention claims the benefit of Japanese Patent application No. 2006-196567 which is hereby incorporated by reference.

FIELD OF THE INVENTION

The present invention relates to a projector optical system used in a projector, for enlarging and projecting onto a screen or the like an image of a display element.

BACKGROUND OF THE INVENTION

Projectors are devices that use a display element such as a liquid crystal device (LCD, LCOS), a DMD or the like as a light bulb, so that the display image thereof is enlarged and projected onto a screen or the like by means of a projector optical system. As a result of ever more demanding performances (high-pixel counts) in display elements, there have been proposed various high-performance projectors that afford both high resolution and sufficient correction of various aberrations (for instance, Japanese Unexamined Patent Application Laid-open No. 2004-279958).

In high-performance projector optical systems, however, the lens count increases, which is problematic in terms of increased size and hindering of miniaturization of the projector as a whole.

SUMMARY OF THE INVENTION

The present invention was devised in view of the above problems, and its object is to provide a projector optical system that affords good image forming performance and a small size by using a diffractive optical element.

To solve the above problems, the projector optical system according to the present invention forms real image by projecting an image of a display element and comprises, sequentially from a projection side, an aperture diaphragm; and a first lens group having positive refractive power and having, in the interior thereof or on a lens surface at a projection side or at a display element side, a diffraction optical surface formed by a multilayer-type diffractive optical element in which diffraction gratings formed on two diffractive element components are arranged facing each other. The projector optical system satisfies the following expression $$0.1 < K/L < 1.5$$

wherein L is a total length on an optical axis, and K is a distance on the optical axis from the aperture diaphragm to a surface of the first lens group that is closest to the projection side, and satisfies also the following expression $$0.01 < \Delta Nd < 0.45$$

wherein $\Delta Nd$ is a difference between refractive indices of the two diffractive element components for a main wavelength (d-line).

In such a projector optical system according to the present invention, preferably, the diffractive optical element has a bonded multilayer constitution in which the diffraction gratings are bonded, and the projector optical system further satisfies the following expression $$50 < \Delta vd/\Delta Nd < 2000$$

wherein $\Delta vd$ denotes an Abbe number difference between the two diffractive element components.

Preferably, the projector optical system further satisfies the following expression $$(Eg+Ec)/2 > 0.85 \times Ed$$

wherein Ed denotes a diffraction efficiency design value for a main wavelength (d-line) of the diffraction optical surface, Eg denotes a diffraction efficiency design value for a short wavelength (g-line) relative to the main wavelength, and EC denotes a diffraction efficiency design value for a long wavelength (C-line) relative to the main wavelength.

Preferably, the projector optical system is symmetrical with respect to an optical axis, and a principal ray of a largest image height has a light ray angle not greater than 10 degrees when passing through the diffraction optical surface formed in the first lens group, the projector optical system further satisfying the following expression $$0.2 < C/f < 2.0$$

wherein C denotes an effective diameter (diameter) of the diffraction optical surface, and f denotes a whole-system focal distance.

Preferably, the projector optical system further satisfies the following expression $$0.02 < h/d < 0.9$$

wherein h denotes a grating height of the diffraction gratings that form the diffraction optical surface, and d denotes a thickness of the diffractive element component having the smaller thickness on the optical axis, among the diffractive element components.

Preferably, the projector optical system further comprises a final lens group having positive refractive power and arranged on the display element side of the first lens group.

As an advantageous effect of the invention, providing a diffraction optical surface on the first lens group in the projector optical system according to the present invention having the above constitution allows achieving good image forming performance even with few lenses, thereby enabling size reduction of the projector optical system as a whole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 is an explanatory diagram illustrating a multilayer-type diffractive optical element, wherein

DESCRIPTION OF THE PREFERRED EMBODIMENTS

Preferred embodiments of the present invention are described below with reference to accompanying drawings. A projector optical system used in a projector is an optical system for irradiating illumination light onto a display element, and for enlarging and projecting, as a real image, an image of light rays reflected by, or passing through, the display element. To ensure brightness, a projector optical system must only have a small F-number and also small chromatic aberration, so as to reduce color shift in the image. It is important also that the projector optical system should be small and lightweight, for it to be installed in a mobile device or the like. The constitution of a projector optical system PS according to the present invention will be explained herein with reference to FIGS. 1 and 2.

The projector optical system PS has, sequentially from the projection side, an aperture diaphragm S and a first lens group G1 having positive refractive power, constituted in such a way so as to enlarge and project the light rays emitted by a display element 20. The projector optical systems PS illustrated in FIGS. 1 and 2 employs herein a reflective liquid crystal display device (LCOS (Liquid Crystal on Silicon) panel) as the display element 20. Accordingly, the projector optical system PS comprises a polarizing beam splitter prism P (hereinafter, "prism P") arranged between the first lens group G1 and the display element 20, a condenser lens 40 where white light emitted by a light source 30 (for instance, a white LED) is condensed to strike laterally (from below, in FIGS. 1 and 2) the prism P, and is reflected to the right to illuminate the display element 20 as illumination light. In the display element 20 there may be used a DMD (digital micromirror device), or a transmissive liquid crystal device (LCD (liquid crystal display device) panel), in which illumination passes through the display element 20.

Figure 1:
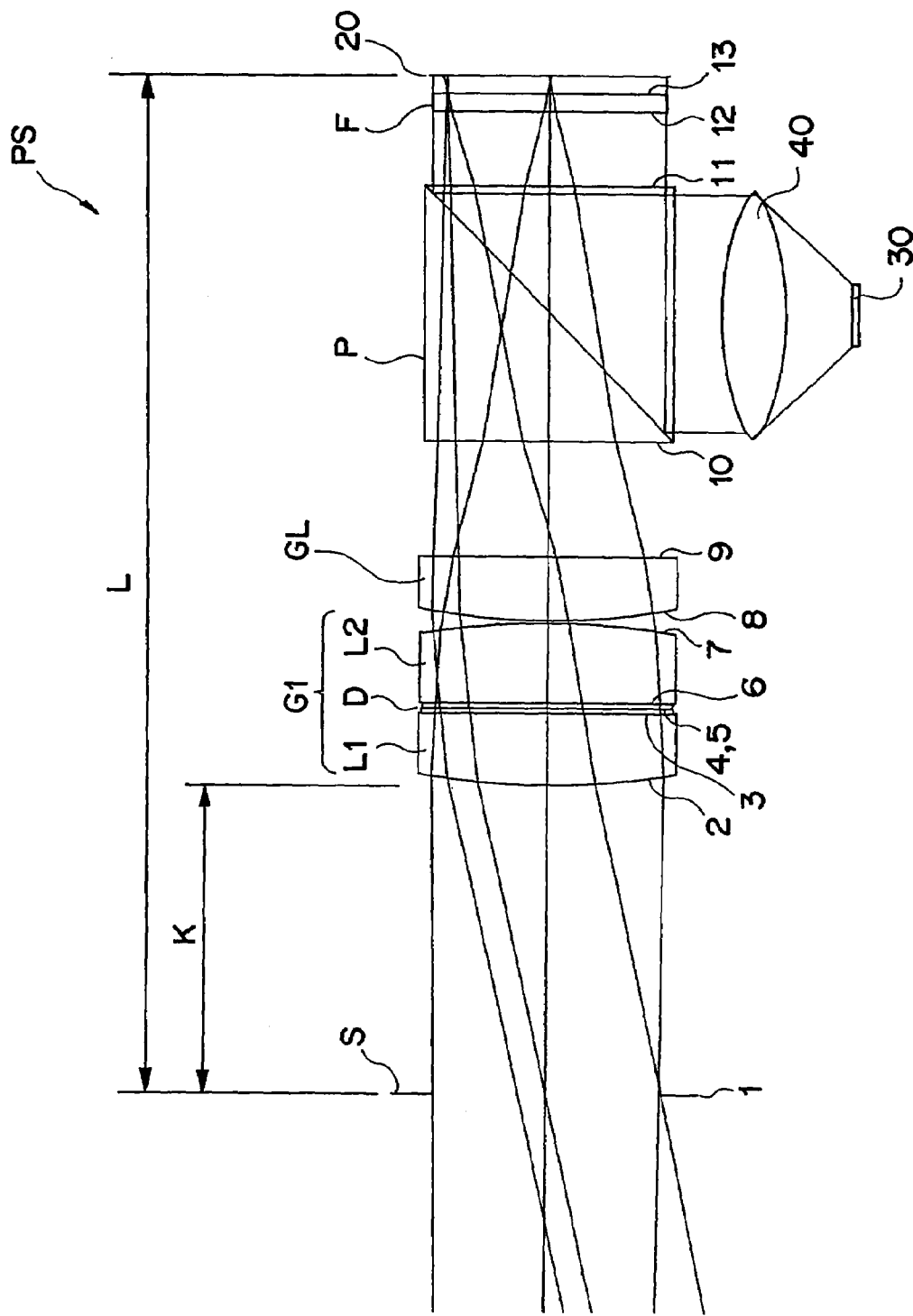
FIG. 1 is a diagram illustrating a lens constitution of a projector optical system according to a first example.
Figure 2:
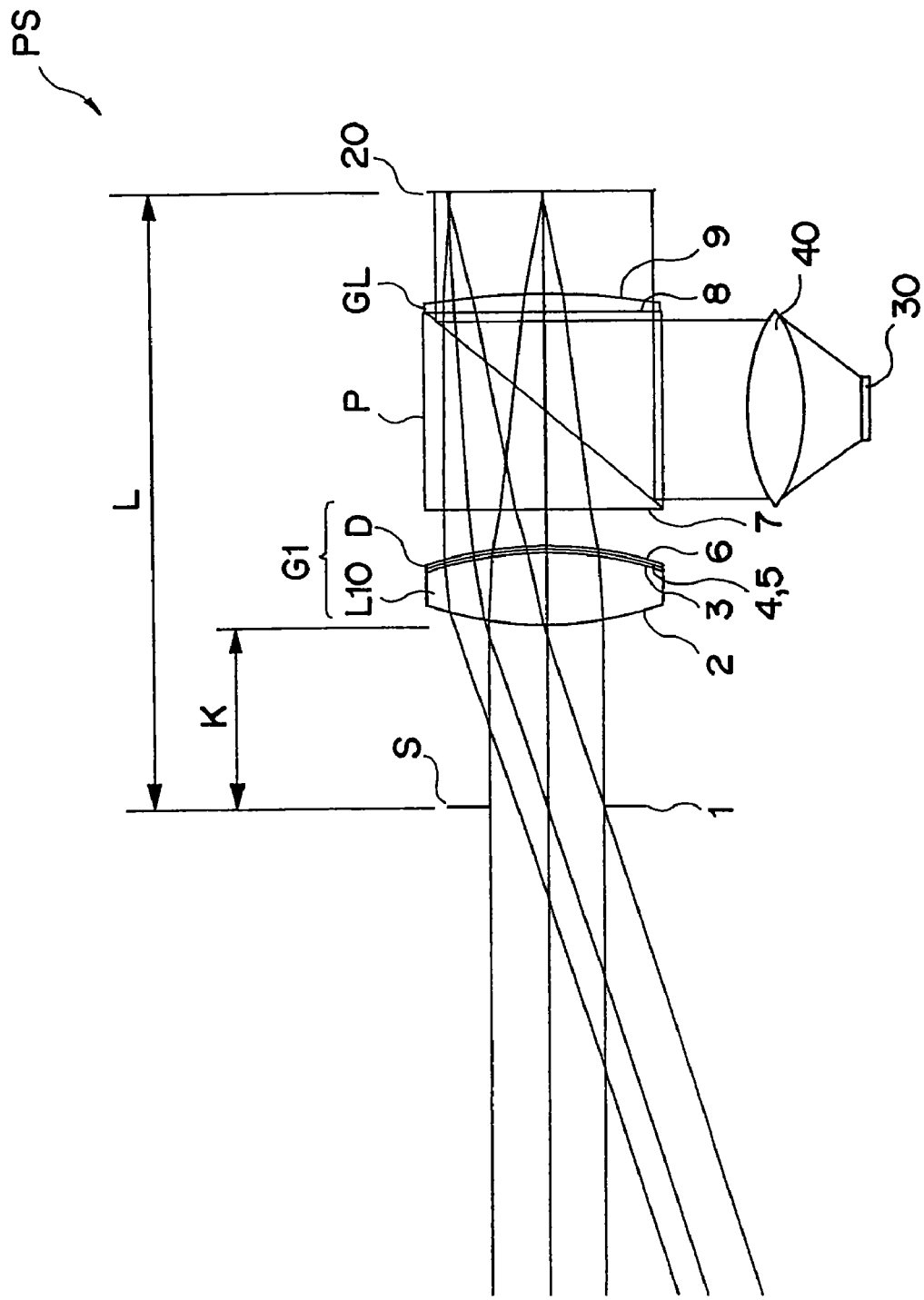
FIG. 2 is a diagram illustrating a lens constitution of a projector optical system according to a second example.

When using such a reflective or transmissive liquid crystal device as the display element 20, a convex field lens is preferably arranged to be as telecentric as possible relative to the display element 20, with a view of using the illumination light efficiently. In order to enhance telecentricity relative to the display element 20, a final lens group GL (convex field lenses) having positive refractive power is arranged at a closest position to the display element 20 of the projector optical system PS. The final lens group GL may be arranged immediately after the first lens group G1, as illustrated in FIG. 1, or at a position that is closest to the display element 20, i.e. so as to impart convex power to the surface of the prism P on the side of the display element 20, as illustrated in FIG. 2. The arrangement illustrated in FIG. 1 affords better chromatic aberration correction, while the arrangement illustrated in FIG. 2 allows the effect of the field lenses to be brought out more efficiently. A protective glass for protecting the display element 20 or a filter F may also be arranged between the display element 20 and the prism P in the projector optical system PS, as illustrated in FIG. 1.

In the projector optical system PS, thus, the illumination light irradiated via the prism P is reflected by the display element 20, so that the light rays emitted by the display element 20 are enlarged by the final lens group GL and the first lens group G1, pass through the aperture diaphragm S, and are projected, as a real image, on a screen or the like. The first lens group G1 and the final lens group GL may comprise plural lenses L1, L2, as in the first lens group G1 illustrated in FIG. 1, or a single lens L10 as in the first lens group G1 illustrated in FIG. 2.

A diffraction optical surface D for chromatic aberration correction is formed inside, or on a front or rear lens surface, of the first lens group G1 comprised by the projector optical system PS. In the first lens group G1 illustrated in FIG. 1, the diffraction optical surface D is formed sandwiched between planoconvex lenses L1, L2, while in the first lens group G1 illustrated in FIG. 2, the diffraction optical surface D is formed on a single lens (biconvex lens) L10, on the side of the display element 20.

Known methods for bending a light ray include, for instance, refraction, reflection, and also diffraction, as a third method. A diffractive optical element, which is an optical element that exploits diffractive phenomena of light, exhibits a behavior that differs from reflection and refraction. Specific conventional examples of diffractive optical elements include, for instance, diffraction gratings and Fresnel zone plates. In the present examples, the diffractive optical element is an optical element on which there is created a surface having the effect of bending light rays through diffractive phenomena, for instance by creating a Fresnel zone plate and/or a diffraction grating on the surface of an optical member made of glass, plastic or the like, so that the light-bending effect imparts the optical system with good optical performance. Such surfaces having the effect of bending light rays through diffractive phenomena are called diffraction optical surfaces. Optical elements having such surfaces are ordinarily called diffractive optical elements.

Although having positive refractive power, such diffractive optical elements have negative dispersion, a characteristic that makes them extremely effective for chromatic aberration correction. Hence, such diffractive optical elements allow achieving good chromatic aberration correction, which is not possible with ordinary glass, and/or achieving good chromatic aberration correction, possible only using expensive special low-dispersion glass.

When used built into an optical system, the optical design characteristics of such diffractive optical elements include, for instance, negative dispersion, abnormal dispersion, and aspheric surface effect. The optical element affords also a Petzval sum of 0, as well as easy light branching and multiplexing. The change of refractive power with temperature is small, and the element can be made thinner. The following features are of interest, in particular, when such a diffractive optical element is used in a projector optical system. Firstly, the diffractive optical element has a negative dispersion value (Abbe number=−3.453), a large dispersion, and a strong abnormal dispersion (partial dispersion ratio=0.2956), and hence it possesses a potent chromatic aberration correction power. The magnitude of the Abbe number of the diffractive optical element is $\frac{1}{10}$ or less than that of glass since the Abbe number of the latter ranges ordinarily from about 30 to about 80. In other words, a diffractive optical element bends light more strongly the longer the wavelength is. A diffractive optical element can provide good chromatic aberration correction, which is unachievable for ordinary glass. Secondly, using a diffractive optical element allows reducing the size and the weight of the projector optical system. The blazed structure and the good achromatic effect of the diffraction grating allows reducing cemented lenses, thereby affording thinner profiles.

Figure 3A:
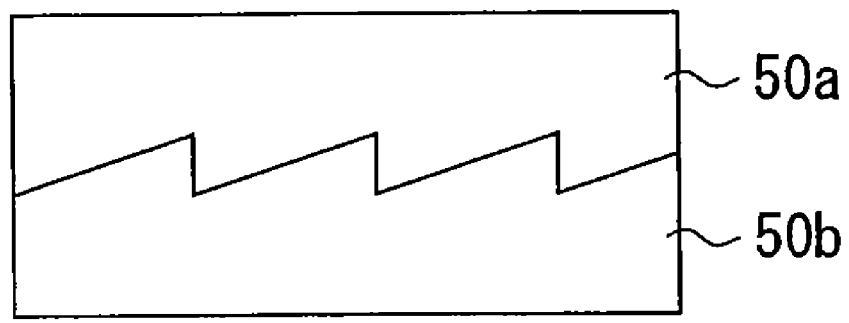
FIG. 3A illustrates a bonded type thereof and FIG. 3B illustrates a decoupled type thereof.
Figure 3B:
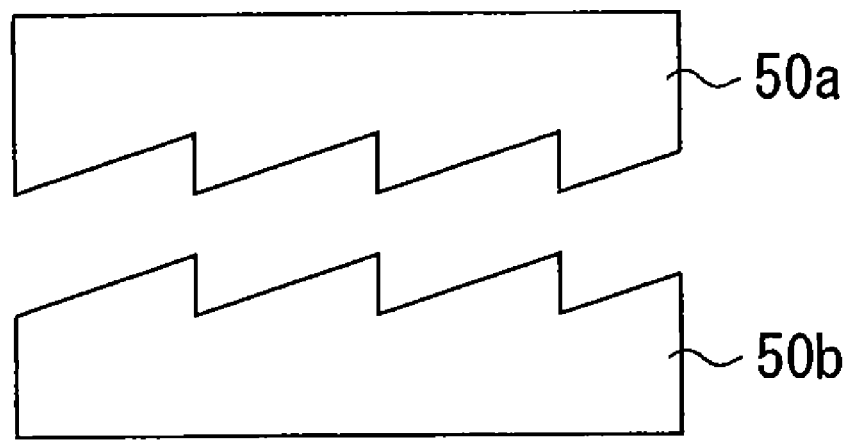

As a side effect, however, diffraction light gives rise to flare, which impairs image quality, except for specific orders/face angles/wavelengths, and hence diffractive optical elements have been limited to monochromatic applications such as pickup lenses or the like. Recent research has shown, nonetheless, that the diffractive effect can be substantially enhanced over a broad wavelength region by stacking plural diffractive elements. This has paved the way for the use of diffractive optical elements in projector optical systems. FIG. 3 illustrates an example of a multilayer diffractive optical element in which two optical element components, having formed thereon respective diffraction gratings, are arranged with the diffraction gratings facing each other. FIG. 3A illustrates a bonded-type multilayer constitution, in which diffraction gratings are formed on respective two diffractive element components 50a, 50b, and then the diffraction gratings are bonded together, while FIG. 3B illustrates a decoupled-type multilayer constitution in which the two diffractive element components 50a, 50b are arranged with the diffraction gratings facing each other with a predetermined gap therebetween. The present example illustrates a constitution in which the diffraction optical surface D provided in the first lens group G1 comprises a bonded multilayer-type diffractive optical element.

The diffraction efficiency of a bonded multilayer diffractive optical element is considered next. The diffraction efficiency at the d-line, F-line and the C-line can reach 100% and a wide band can be achieved, when ΔNd which is the reference refractive index difference between the two diffractive element components (grating materials) that make up a bonded multilayer diffractive optical element, and a difference Δ(NF−NC) of a main dispersion NF−NC satisfy the following formula:

$$\Delta Nd/\Delta(NF-NC)=\lambda d/(\lambda f-\lambda c)=-3.453$$

wherein Nd is a reference refractive index for a main wavelength (d-line λd=587.6 nm), NF is the refractive index for the F-line (λf=486.1 nm), and NC is the refractive index for the C-line (λc=656.3 nm).

Figure 4:
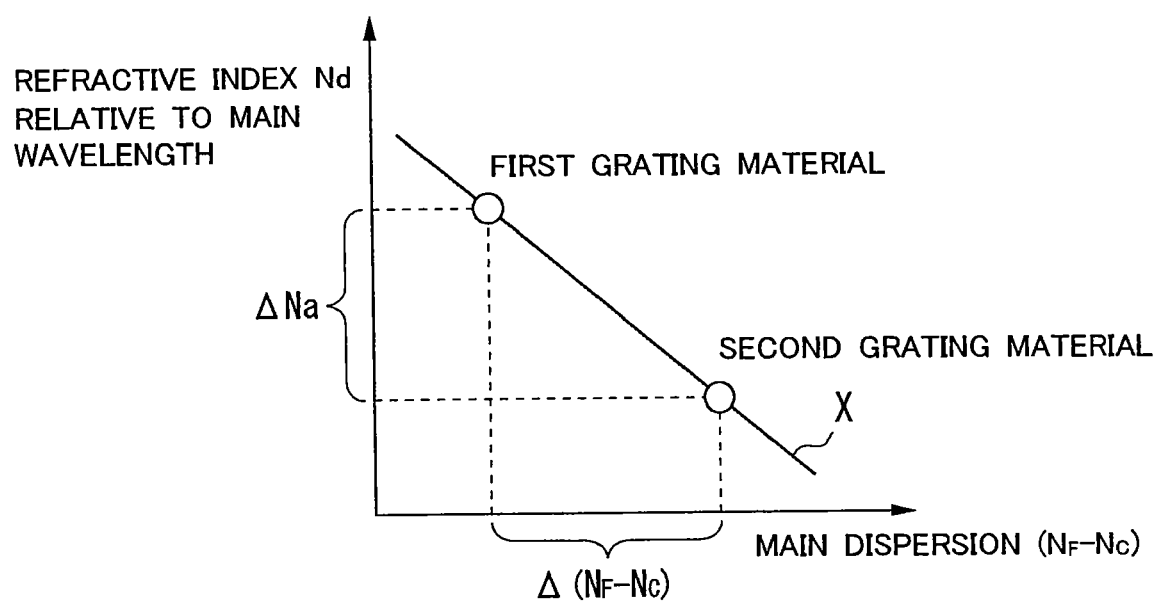
FIG. 4 is an explanatory diagram illustrating a glass map distribution of two diffractive element components comprised in a multilayer-type diffractive optical element.

That is, upon selecting an appropriate grating material on a glass map, the slope of the straight line X illustrated in FIG. 4 that joins the two grating materials that form a bonded multilayer diffractive optical element should coincide with the Abbe number (=−3.435). The grating material may be selected from any point on the straight line X, although in practice sufficiently high diffraction efficiency can be achieved even for points diverging somewhat from the straight line X.

Preferably, the angle of the light ray passing through the diffraction optical surface of the optical system should normally be as small as possible. Ordinarily, many of the surfaces of the blazes (walls) of the grating are substantially perpendicular, so that when the angle of the light rays passing through the diffraction optical surface is large, the diffraction optical surface is apt to give rise to flare (a phenomenon in which light other than that of a predetermined blazed order becomes detrimental light that reaches the projection surface), which impairs image quality. In the case of the present projector optical system, therefore, the angle of the light rays passing through the diffraction optical surface D is preferably not greater than 10 degrees, with a view of obtaining a good image not unduly influenced by the flare generated by the diffraction optical surface D. If at all possible, that condition is more easily and hence preferably satisfied by forming the diffraction optical surface D on a convex surface on the object side (i.e., on the side of the display element 20), although the diffraction optical surface D may also be arranged at the position of the first lens group G1. To elicit a full effect, the angle of the light rays passing through the diffraction optical surface D is more preferably not greater than 5 degrees. Stacking a plurality of such gratings using a multilayer diffractive optical element allows enhancing diffraction efficiency over a wavelength wide band while reducing flare, and hence such stacks are suitably used in cameras and projectors.

The conditions for constituting the projector optical system PS according to the present example are explained next. The projector optical system PS satisfies conditional expression (1)

$$0.1<K/L<1.5 \qquad (1)$$

wherein L is an optical total length (length on the optical axis from the aperture diaphragm S to the display element 20), and K is the length on the optical axis from the aperture diaphragm S to the surface of the first lens group G1 that is closest to the projection side. The projector optical system PS satisfies also conditional expression (2)

$$0.015<\Delta Nd<0.45 \qquad (2)$$

wherein ΔNd is a refractive index difference between the reference refractive indices Nd of the two diffractive element components of the multilayer optical element component in which the diffraction optical surface D is formed.

Conditional expression (1) prescribes an appropriate range for the position of the aperture diaphragm S, and is important for achieving astigmatism balance and good image forming performance. Exceeding the upper limit of the conditional expression (1) implies an excessively large K and thus an excessively large diameter of the optical system on the side of the display element 20 from the aperture diaphragm S, which precludes reducing the size of the projector optical system PS. Exceeding the upper limit is also problematic in that coma aberration is likelier to occur for light rays above the principal ray in FIGS. 1 and 2. Below the lower limit of the conditional expression (1), conversely, K becomes excessively small, which increases the likelihood of coma aberration occurring for light rays below the principal ray, reinforcing the tendency of distortion to become larger on the front side, which is undesirable.

Conditional expression (2) prescribes an appropriate range for the error sensitivity of the diffractive optical element used in the first lens group G1. Satisfying conditional expression (2) allows easing the manufacturing error sensitivity and reducing Fresnel reflection at interfaces. Exceeding the upper limit of conditional expression (2) implies an excessively large ΔNd, and hence excessive error sensitivity of the surface roughness and/or of the grating height of the diffraction grating, all of which is problematic. Below the lower limit of the conditional expression (2), the height of the grating becomes too large, and the blazed portions of the grating give rise to enhanced flare, which is problematic. To fully bring out the effect of the conditional expression (2), the upper limit thereof is preferably set to 0.3, or preferably to 0.2.

Also, loss of diffraction efficiency is prevented by forming the diffraction optical surface D provided on the first lens group G1 using bonded multilayer-type diffractive optical elements since, unlike in a decoupled diffractive optical element, when one grating height deviates from the design value the other grating acquires automatically the same height. Also, the grating interface in a bonded multilayer type exhibits a smaller refractive index, which reduces the influence of the grating interface roughness (since dispersion is believed to vary normally in proportion to the square of the refractive index difference). Moreover, there arises fundamentally no eccentricity between the two diffractive element components, which makes for good-precision alignment between the two gratings (and, in consequence, a smaller loss in diffraction efficiency).

When in the present example the diffraction optical surface D provided in the first lens group G1 results from a bonded multilayer diffractive optical element, conditional expressions (3) through (5) below are preferably also satisfied, in addition to the above conditional expressions.

$$50 < \Delta vd / \Delta Nd < 2000 \quad (3)$$

$$(Eg+Ec)/2 > 0.85 \times Ed \quad (4)$$

$$0.2 < C/f < 2.0 \quad (5)$$

In conditional expression (3), $\Delta vd$ denotes the Abbe number difference between the two grating materials that form the bonded multilayer diffractive optical element. In conditional expression (4), Ed denotes the diffraction efficiency design value for a main wavelength (d-line), Eg denotes the diffraction efficiency design value for a short wavelength (g-line, $\lambda g$=435.8 nm) relative to the main wavelength, and EC denotes a diffraction efficiency design value for a long wavelength (C-line) relative to the main wavelength. In conditional expression (5), C denotes the effective diameter (diameter) of the diffraction optical surface D, and f denotes the focal distance of the overall projector optical system PS.

Conditional expression (3) is a condition for prescribing a suitable range for the optical media of a high-refractive index, low-dispersion material and a low-refractive index and high dispersion material that make up a bonded multilayer diffractive optical element. This can be interpreted as constitution in which blaze conditions hold in a wide wavelength region, with the dispersion of the used grating materials being substantially constant, since in a bonded-type diffractive optical element $\alpha$ is $(N_{1\lambda} - N_{2\lambda}) h/\lambda$, wherein the diffraction efficiency of primary diffracted light in the diffraction optical surface is expressed as $\text{SINC}^2 (\alpha - 1)$. Exceeding the upper limit of conditional expression (3) precludes achieving high diffraction efficiency over a wavelength wide band. Below the lower limit of conditional expression (3), likewise, high diffraction efficiency over a wavelength wide band cannot be achieved. With a view of bringing out the full effect of conditional expression (3), the upper limit thereof is preferably set to 1000 and the lower limit is set to 1000.

Conditional expression (4) prescribes an appropriate range for a balance of the diffraction efficiency for the d-line, g-line and C-line in a wide-band situation. Within this range there can be achieved in practice sufficiently high and balanced diffraction efficiency across wavelengths from the g-line to the C-line. Beyond the upper and lower limits of the conditional expression (4), diffraction efficiency drops for either short of long wavelengths, which increases diffraction flare and impairs image quality. With a view of bringing out the full effect of conditional expression (4), the lower limit of the value in the right side of the expression (the coefficient by which Ed is multiplied) is preferably set to 0.9.

Conditional expression (5) prescribes an appropriate range for the effective diameter (diameter) of the diffraction optical surface D. Within this range there can be avoided higher manufacturing costs, as well as problems such as flare or the like caused by detrimental light. Exceeding the upper limit of conditional expression (5) implies an excessive diameter, which results in a costlier, more difficult manufacture of the diffraction optical surface. The larger diameter makes it likelier for outer detrimental light to strike the diffraction optical surface, thereby impairing image quality as a result of flare or the like. Below the lower limit of the conditional expression (5), conversely, the appropriate effective diameter of the lens (the first lens group G1 in the present example) having the diffraction optical surface D becomes too small, reinforcing the trend towards a smaller grating pitch on the diffraction optical surface, which results not only in a costlier, more difficult manufacture of the diffraction optical surface, but also in increased flare by the grating of the diffraction optical surface, which impairs image quality. With a view of bringing out the full effect of conditional expression (5), the upper limit thereof is preferably set to 0.3 and the lower limit is set to 1.0.

In the present example, conditional expressions (6) through (8) below are also preferably satisfied.

$$0.02 < h/d < 0.9 \quad (6)$$

$$0.001 < A/f < 0.03 \quad (7)$$

$$0.3 < fL/L < 5.0 \quad (8)$$

In conditional expression (6), h denotes the grating height of the diffraction grating that forms the diffraction optical surface D, and d denotes the thickness of the diffractive element component having the smaller thickness on the optical axis, among the two diffractive element components (50a, 50b). In conditional expression (7), A denotes the spreading width on the optical axis of the d-line, g-line, C-line and F-line spectra. In conditional expression (8), fL denotes the focal distance of the convex lens component (i.e., the final lens group GL) arranged more toward the side of the display element 20 than the first lens group G1 that comprises the diffraction optical surface D.

Conditional expression (6) denotes the relationship between appropriate grating height h and thickness d upon formation of a thin grating. Within the range of conditional expression (6), grating height is not excessively large, so that diffractive optical element manufacture is easier, while preventing flare caused by scattering and the effect of the shadow of the blazed portions of the grating (reduced diffraction efficiency). When the upper limit of the conditional expression (6) is exceeded the grating becomes relatively too high, which in addition to making manufacture of the grating shape more difficult, adds to the size of the grating blazed portions and increases the likelihood of stray light through, for instance, scattering of light striking the blazed portions, all of which is problematic. Below the lower limit of the conditional expression (6), conversely, the optical material that forms the grating becomes relatively too thick, which in addition to making manufacture of the grating shape more difficult, exacerbates internal absorption by the material, thus impairing transmissivity of the optical system as a whole and increasing the likelihood of coloring, all of which is problematic. With a view of bringing out the full effect of conditional expression (6), the upper limit thereof is preferably set to 0.5 and the lower limit is set to 0.035.

Conditional expression (7) prescribes the condition for appropriate axial chromatic aberration correction. Within the range of conditional expression (7) axial chromatic aberration can be sufficiently corrected, and excellent image quality can be obtained with little color shift. Beyond the upper limit of conditional expression (7) chromatic aberration becomes excessively large, and the image exhibits coloring, thus impairing image quality. Below the lower limit of the conditional expression (7), conversely, the grating pitch tends to be too small, which in addition to making manufacture of the grating shape more difficult, results in increased flare on account of the narrow-pitch grating, thereby impairing image quality. With a view of bringing out the full effect of conditional expression (7), the upper limit thereof is preferably set to 0.02 and the lower limit is set to 0.002.

Conditional expression (8) specifies the condition of a correction range for an appropriate focal distance of the final lens group GL. Satisfying conditional expression (8) allows enhancing image forming performance and optimizing pupil position. Beyond the upper limit of conditional expression (8) fL becomes too large, which tends to result in an undesirably closer pupil. Below the lower limit of conditional expression (8) the power of the final lens group GL becomes too small so that the astigmatism balance becomes more prone to collapsing. As a result, distortion tends to increase on the angle side, which is problematic. With a view of bringing out the full effect of conditional expression (8), the upper limit thereof is preferably set to 3.0 and the lower limit is set to 0.8.

When such a projector optical system PS is used in a projector, the following constitutional requirements are preferably further satisfied. Firstly, the diffraction optical surface D is arranged on a spherical surface so as to be concentrical with the aperture diaphragm S. From the viewpoint of enhancing durability, both sides of the diffraction optical surface D are preferably encapsulated in an optical material such as glass, resin or the like. For achieving good chromatic aberration correction, the first lens group G1 may comprise bonded lenses. The bonded lenses may then comprise a planoconvex lens and a planoconvex lens, or a biconvex lens and a concave meniscus lens. The first lens group G1 in FIG. 1 comprises a planoconvex lens and a planoconvex lens bonded together, such that the diffraction optical surface D is formed at the bonding surface between the two lenses. That is, the diffraction optical surface D is sandwiched between two lenses L1, L2, in a constitution that affords more durability and robustness. In the projector optical system PS, the simplest method for close-distance object focusing is the so-called front focus method, in which the first lens group G1 is thrust out towards the object (projection surface side).

The projector optical system PS according to the present example may comprise a vibration-proof lens system in which there are assembled shake detection means for detecting the shake of the lenses that make up the projector optical system PS; a shake control device for setting a shake correction amount on the basis of a signal from the shake detection means and a signal from control means for controlling the operation sequence of the projector; and a driving mechanism for moving a vibration-proof lens on the basis of the shake correction amount. Such a constitution allows the projector in which the optical system PS is installed to enlarge and project images while being manually held. The movable element for the purpose of countering vibration may be the first lens group G1, the prism P, or the display element 20.

Preferably, one of the diffractive element components (the diffractive element components 50a, 50b in FIG. 3) that form the diffraction optical surface D in the first lens group G1 comprises a material having a viscosity (uncured product viscosity) of at least 40 or more, with a view of preserving good moldability and ensuring superior productivity. A viscosity of 40 or below is problematic in that resin flow is exacerbated during molding, which hampers precision of the molded shape. On the other hand, the viscosity of the material constituting the other diffractive element component is, by contrast, preferably at least 2000. In terms of increasing productivity, at least one of the diffractive element components that form the diffraction optical surface D comprises preferably a W curable resin. This allows reducing man-hours and is hence advantageous for cutting costs. Productivity can be enhanced even further when both diffractive element components comprise an UV curable resin.

For manufacturing an actual diffraction optical surface, an easy and hence preferable way is to create, on a lens surface, a grating structure that is rotationally symmetrical vis-à-vis the optical axis, for instance a Fresnel zone plate or the like. This can be done by precision grinding or glass molding, as in the manufacture of ordinary aspherical lenses. The grating structure may also be formed on the lens surface by means of a thin resin layer. The grating is not limited to a pure single-layer structure such as a kinoform structure or the like, but is advantageously formed by staking plural grating structures, as this allows enhancing the wavelength characteristic and/or the image angle characteristic of the diffraction efficiency.

The blazed portions of the diffraction grating that forms the diffraction optical surface D need not necessarily be parallel to the optical axis, and may form an angle in the direction along which the light bundles pass. In this case, causing the blazed portions to face the pupil of the optical system arguably allows flare to be reduced. Also, shaping as an aspherical surface the surface formed by the diffractive element components (optical material) on the side where the grating is formed allows the surface to be used as a degree of freedom in astigmatism correction. Image quality can be improved through a filter effect wherein a coloring agent for Uv cutting is infused in the diffractive element components that form the grating, without arranging special filtering members in the optical system.

Needless to say, an even better optical performance can achieved by using also refractive index distribution-type lenses or the like as the lenses that make up the projector optical system PS of the present example. Using a Fresnel lens as the condenser lens 40 for condensing the light rays emitted by the above-described light source definition conversion unit 30 allows further reducing the size and slimming the profile of the projector in which the projector optical system PS is used.

In the above explanation, a reflective LCOS was used as the display element 20, such that white light emitted by the light source 30 strikes the display element 20 via the prism P, and the light rays reflected by the display element 20 are projected. However, there may be provided three color light sources for red, blue and green, and three display elements corresponding to the three light sources, such that the light rays emitted by the respective display elements are combined at the prism P, after which they are projected by the projector optical system PS according to the present example. Such a constitution can be used not only for a reflective or transmissive liquid crystal element, but also for a self light-emitting display element. The prism P comprises preferably a polarizing beam splitter, on account of the resulting good projection efficiency. Thanks to the enhanced projection afforded thereby, the prism P comprises preferably a wire grid-type polarizing beam splitter. Wire grid polarizing beam splitters, in which sub-wavelength-pitch fine wires made of a metal or the like are arranged periodically on a substrate, afford a high-performance polarized light characteristic. A sub-wavelength pitch is in the order of 1/10 the wavelength of the used light. In the present application there are used pitches of 50 nm and 100 nm, although any arbitrary pitch equal to or smaller than the wavelength of the used light may be employed herein. The polarizing beam splitter is not limited to a prism, and may be embodied as a light-transmitting plate, a mirror or the like.

EXAMPLES

Two examples of the projector optical system PS according to the present invention are explained next. In the examples, the phase difference of the diffraction optical surface D formed on the first lens group G1 is calculated in accordance with an ultrahigh refractive index method using ordinary refractive indices and the below-described aspherical surface equation (a). The ultrahigh refractive index method uses a determined equivalence relationship between aspherical surface shape and the grating pitch of a diffractive optical surface. In the examples, the diffractive optical surfaces are represented by data obtained in accordance with the ultrahigh refractive index method, i.e., on the basis of the below-described aspherical equation (a) and coefficients thereof. The aberration characteristics selected for calculations in the examples correspond to the d-line, the g-line, the C-line and the F-line. The wavelengths for the d-line, the g-line, the C-line and the F-line used in the present examples, as well as the refractive index values set for each spectral line and used in the calculation according to the ultrahigh refractive index method, are given in Table 1.

TABLE 1

| | Wavelength | Refractive index (according to the ultrahigh refractive index method) |
|---|---|---|
| d-line | 587.562 nm | 10001 |
| g-line | 435.835 nm | 7418.6853 |
| C-line | 656.273 nm | 11170.4255 |
| F-line | 486.133 nm | 8274.7311 |

In the examples, the aspherical surface is given by the conditional expressions (a) and (b)

$$S(y) = (y^2/r)/\{1 + (1 - k \cdot y^2/r^2)^{1/2}\} + C_2 \cdot y^2 + C_4 \cdot y^4 + C_6 \cdot y^6 + C_8 \cdot y^8 + C_{10} \cdot y^{10} + \ldots \quad (a)$$

$$R = 1/\{(1/r) + 2C_2\} \quad (b)$$

wherein y is the height in the direction perpendicular to the optical axis, S(y) is the distance (sag) along the optical axis from a tangential plane at the apex of the aspherical surface to a position on the aspherical surface at the height y, r is the curvature radius of a reference spherical surface, R is the paraxial curvature radius, k is a conic coefficient, and Cn are n-th order aspherical surface coefficients.

In the examples, the lens surfaces formed as an aspherical surface are marked in the tables with an asterisk * to the right of the surface number. The aspherical surface equation (a) represents data on the performance of the diffractive optical surface.

Among the lens data, the coefficient $C_2$, which denotes the paraxial power of the diffraction optical surface, is an important magnitude for achromatism. The range $|1 \times 10^{-10}| < C_2 < |1 \times 10^{-4}|$ holds preferably in the present examples. Beyond that range, good achromatism cannot be achieved. To achieve moreover good diffraction efficiency across a wavelength wide band, the value of $\Delta Nd/\Delta(NF-NC)$ lies within a predetermined range. The range $-15 < \Delta Nd/\Delta(NF-NC) < -2$ holds preferably in the present examples. Beyond that range, good diffraction efficiency cannot be achieved across a wavelength wide band.

First Example

FIG. 1, used in the above explanation, illustrates a first example of the projector optical system PS according to the present invention, where light rays irradiated from the projection side form an image on a display element 10 (i.e., an instance of inverse ray tracing). Table 2 illustrates various data of the projector optical system PS according to the first example as illustrated in FIG. 1. In table 2, the first column m represents the number of the various optical surfaces, from the projection side, that correspond to the surface numbers 1 to 13 illustrated in FIG. 1 (an asterisk * to the right indicates a lens surface formed as a diffraction optical surface). The second column r represents the radius of curvature of the optical surface (the radius of curvature of a baseline reference spherical surface, in the case of an aspherical surface), the third column d represents the distance on the optical axis from the respective optical surface to the next optical surface, and the fourth column nd, the fifth column ng, the sixth column nC and the seventh column nF represent the refractive indices for the respective d-line, g-line, C-line and F-line. In the aspherical surface data, the n-th order aspherical surface coefficient Cn equal to 0 (zero) has been omitted. The values corresponding to the above-described conditional expressions (1) through (8), i.e. the condition-corresponding values, are also indicated below. The above explanation applies also for the table in the other example.

Unless otherwise specified, the units used for the radius of curvature r, the surface gap d and other lengths are "mm" for all the values below. The units, however, are not limited to "mm", and other suitable units may be used, since the same optical performance is obtained when proportionally expanding or contracting the optical radius.

TABLE 2

| | r | d | nd | ng | nC | nF |
|---|---|---|---|---|---|---|
| 1 | 0.00000 | 12.00000 | 1.000000 | | | |
| 2 | 28.79601 | 2.81000 | 1.524700 | 1.536490 | 1.521960 | 1.531290 |
| 3 | 0.00000 | 0.20000 | 1.518900 | 1.538000 | 1.514400 | 1.528900 |
| 4* | 0.00000 | 0.00000 | 10001 | 7418.6853 | 11170.4255 | 8274.7311 |
| 5 | 0.00000 | 0.20000 | 1.556900 | 1.570900 | 1.553600 | 1.564700 |
| 6 | 0.00000 | 3.13000 | 1.524700 | 1.536490 | 1.521960 | 1.531290 |
| 7 | −28.78899 | 0.10000 | 1.000000 | | | |
| 8 | 25.95000 | 2.50000 | 1.516800 | 1.526690 | 1.514320 | 1.522380 |
| 9 | 0.00000 | 4.53300 | 1.000000 | | | |
| 10 | 0.00000 | 10.00000 | 1.516330 | 1.521910 | 1.526210 | 1.513860 |
| 11 | 0.00000 | 2.90960 | 1.000000 | | | |
| 12 | 0.00000 | 0.70000 | 1.522160 | 1.533190 | 1.519460 | 1.528340 |
| 13 | 0.00000 | 0.70016 | 1.000000 | | | |

(Aspherical surface data)
Second surface $k = -1.2440 \quad C_4 = 4.75000 \times 10^{-5} \quad C_6 = -1.24690 \times 10^{-6}$
$C_8 = 1.36500 \times 10^{-8} \quad C_{10} = -6.23160 \times 10^{-11}$ TABLE 2-continued Fifth surface k = 1.0000 $C_2$ = 1.49600 × $10^{-7}$ $C_4$ = −1.47720 × $10^{-9}$
$C_6$ = 4.37060 × $10^{-11}$ $C_8$ = −5.33850 × $10^{-13}$
$C_{10}$ = 2.28480 × $10^{-15}$
Seventh surface k = −9.3788 $C_4$ = −7.74480 × $10^{-6}$ $C_6$ = −5.16060 × $10^{-7}$
$C_8$ = 5.51070 × $10^{-9}$ $C_{10}$ = −2.62390 × $10^{-11}$
(Condition-corresponding values)

K = 12
L = 39.78276
Δvd = 14.38
ΔNd = 0.038
Eg = 94.372
EC = 96.490
Ed = 99.706
C = 9
f = 17.844
h = 0.015
d = 0.2
Δ = 0.0931
fL = 50.213
(1) K/L = 0.3016
(2) ΔNd = 0.038
(3) Δvd/Nd = 378.42
(4) (Eg + EC)/2 = 95.431
   0.85 × Ed = 84.750
(5) C/f = 0.5044
(6) h/d = 0.075
(7) Δ/f = 0.0052
(8) fL/L = 1.2622

Figure 5:
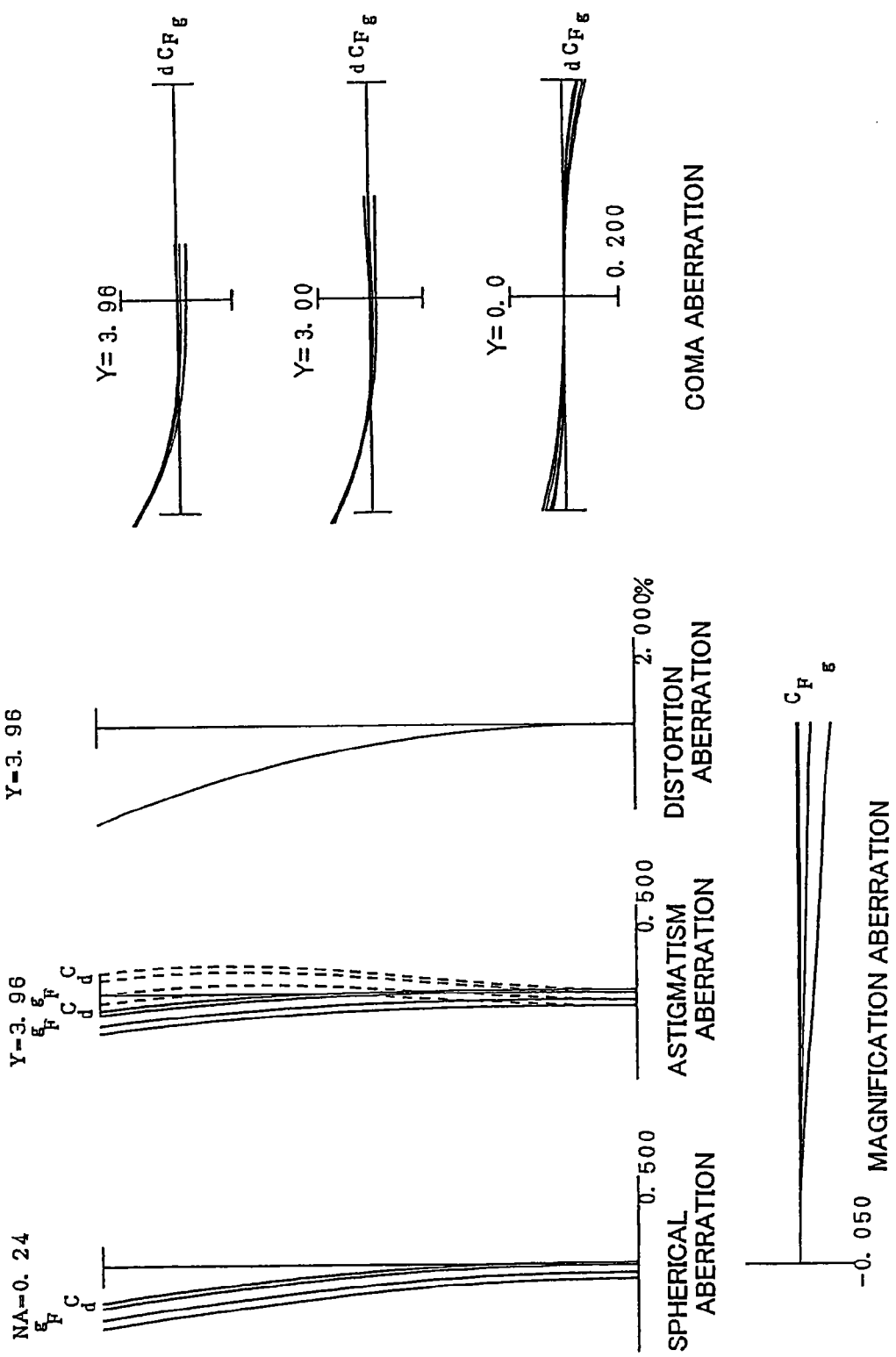
FIG. 5 is a set of aberration graphs of the projector optical system according to the first example.

As can be seen, all conditional expressions (1) through (8) are satisfied in the first example. FIG. 5 illustrates various aberration graphs, for spherical aberration, astigmatism, distortion, coma and magnification chromatic aberration in the first example, with focus at infinity. In the aberration graphs, NA denotes the numerical aperture and Y denotes the image height. In the spherical aberration graph is represented the value of the NA corresponding to maximum aperture. In the astigmatism graph and the distortion graph are illustrated the largest value of image height, while in the coma aberration graph are illustrated various image heights. In the astigmatism graph, the solid line denotes the sagittal image surface while the broken line denotes the meridional image surface. The above explanation of the aberration graphs applies equally to the other example. As the various aberration graphs of FIG. 5 clearly indicate, the first example affords good aberration correction, thereby ensuring excellent image forming performance.

Second Example

The projector optical system PS illustrated in FIG. 2, used in the above explanation, will be described next as a second example. FIG. 2 illustrates as well a case of inverse ray tracing in which light rays irradiated from the projection side from an image on the display element 10. Table 3 illustrates various data of the projector optical system PS according to the second example as illustrated in FIG. 2. The surface numbers listed in Table 3 corresponding to the surface numbers 1 through 9 illustrated in FIG. 2.

TABLE 3

| m | r | d | nd | ng | nC | nF |
|---|---|---|----|----|-----|-----|
| 1 | 0.00000 | 5.00000 | 1.000000 | | | |
| 2 | 9.50000 | 2.00000 | 1.524700 | 1.536490 | 1.521960 | 1.531290 |
| 3 | −9.50000 | 0.10000 | 1.527600 | 1.547700 | 1.523300 | 1.538500 |
| 4* | −9.50000 | 0.00000 | 10001 | 7418.6853 | 11170.4255 | 8274.7311 |
| 5 | −9.50000 | 0.10000 | 1.566900 | 1.571100 | 1.553700 | 1.564800 |
| 6 | −9.50000 | 1.00000 | 1.000000 | | | |
| 7 | 0.00000 | 5.50000 | 1.516800 | 1.526690 | 1.514320 | 1.522380 |
| 8 | 0.00000 | 0.50000 | 1.491080 | 1.501900 | 1.488540 | 1.497070 |
| 9 | −20.00000 | 2.87208 | 1.000000 | | | |

(Aspherical surface data)
Second surface k = −1.2440 $C_4$ = 1.32180 × $10^{-3}$ $C_6$ = −3.18610 × $10^{-4}$
$C_8$ = 3.32800 × $10^{-8}$ $C_{10}$ = −1.28000 × $10^{-6}$ TABLE 3-continued Fourth surface $k = -11.000 \; C_4 = -2.15510 \times 10^{-4} \; C_6 = -1.31870 \times 10^{-4}$
$C_8 = 1.29310 \times 10^{-5} \; C_{10} = -5.65350 \times 10^{-7}$ Fifth surface $k = -11.0000 \; C_2 = -4.46000 \times 10^{-7} \; C_4 = -2.15510 \times 10^{-4}$
$C_6 = -1.31870 \times 10^{-4} \; C_8 = 1.29310 \times 10^{-5}$
$C_{10} = -5.65350 \times 10^{-7}$ Third surface $k = -11.000 \; C_4 = -2.15510 \times 10^{-4} \; C_6 = -1.31870 \times 10^{-4}$
$C_8 = 1.29310 \times 10^{-5} \; C_{10} = -5.65350 \times 10^{-7}$ Sixth surface $k = -11.000 \; C_4 = -2.15510 \times 10^{-4} \; C_6 = -1.31870 \times 10^{-4}$
$C_8 = 1.29310 \times 10^{-5} \; C_{10} = -5.65350 \times 10^{-7}$ (Condition-corresponding values)

K = 5
L = 17.072
Δvd = 15.46
ΔNd = 0.0293
Eg = 98.221
EC = 98.233
Ed = 99.999
C = 5.49
f = 8.134
h = 0.02
d = 0.1
Δ = 0.0289
fL = 40.727
(1) K/L = 0.2929
(2) ΔNd = 0.0293
(3) Δvd/Nd = 527.65
(4) (Eg + EC)/2 = 98.227
0.85 × Ed = 84.999
(5) C/f = 0.6749
(6) h/d = 0.2
(7) Δ/f = 0.0036
(8) fL/L = 2.3856

Figure 6:
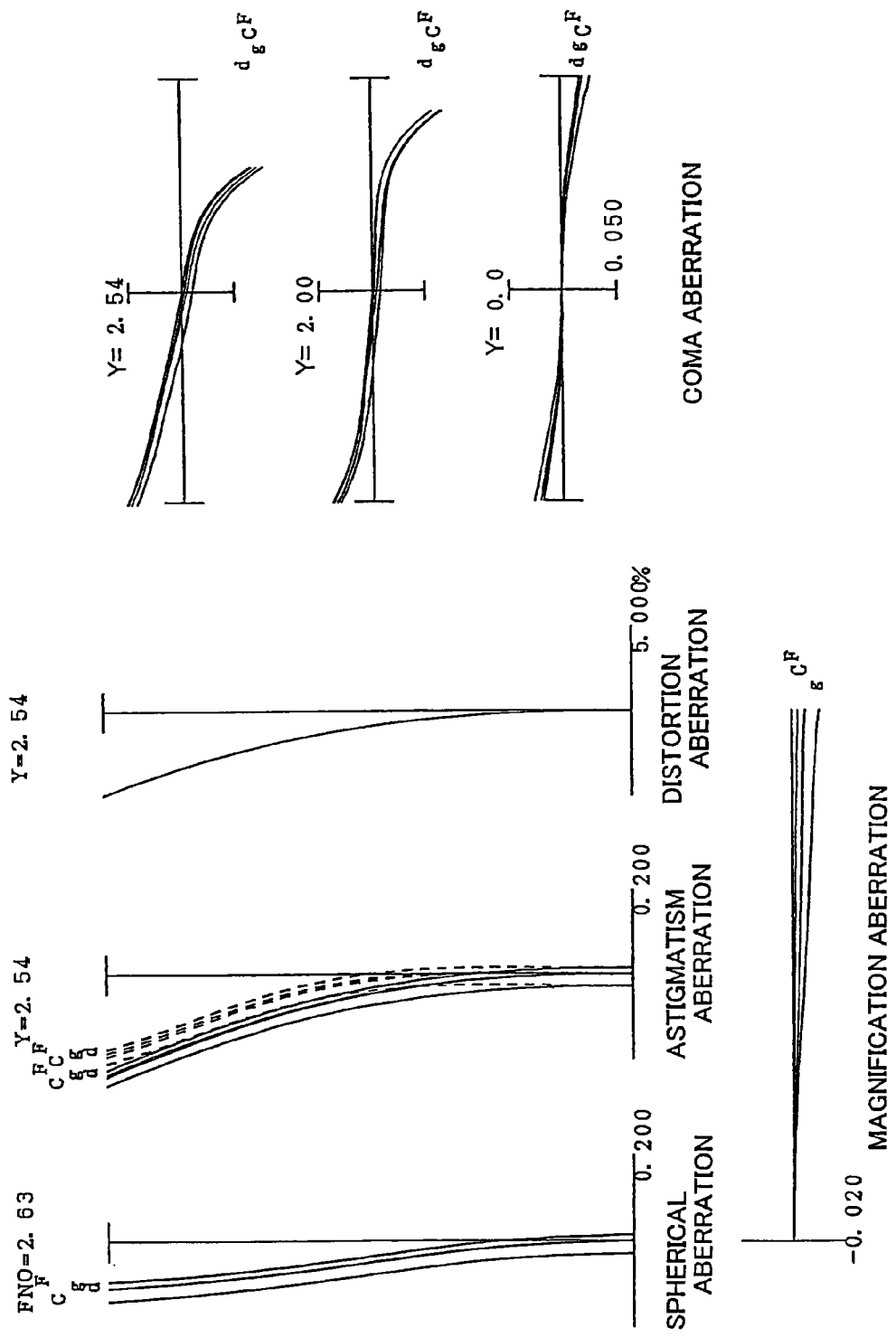
FIG. 6 is a set of aberration graphs of the projector optical system according to the second example.

As can be seen, all conditional expressions (1) through (8) are satisfied in the second example. The various aberration graphs for spherical aberration, astigmatism, distortion, coma and magnification chromatic aberration, with focus at infinity, in the projector optical system PS according to the second example of FIG. 6 clearly indicate that also the second example affords good aberration correction, thereby ensuring excellent image forming performance.

From the above explanation it follows that providing the diffraction optical surface D on the first lens group G1 in the projector optical system PS according to the first and second examples affords good image forming performance even with few lenses, thereby enabling miniaturization of the projector optical system PS as a whole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projector optical system which is used in a projector and which forms a real image by projecting an image of a display element, comprising:
   sequentially from a projection side,
   an aperture diaphragm; and
   a first lens group having positive refractive power and having, in the interior thereof or on a lens surface at a projection side or at a display element side, a diffraction optical surface formed by a multilayer-type diffractive optical element in which diffraction gratings formed on two diffractive element components are arranged facing each other;
   the projector optical system satisfying the conditional expression $0.01 < \Delta Nd < 0.45$ wherein ΔNd is a difference between refractive indices of said two diffractive element components for a main wavelength (d-line).

2. The projector optical system according to claim 1, further satisfying the following expression $0.1 < K/L < 1.5$ wherein L is a total length on an optical axis, and K is a distance on the optical axis from said aperture diaphragm to a surface of said first lens group that is closest to the projection side.

3. The projector optical system according to claim 1, wherein said diffractive optical element has a bonded multilayer constitution in which said diffraction gratings are bonded, and the projector optical system further satisfies the following expression $50 < \Delta vd / \Delta Nd < 2000$ wherein Δvd denotes an Abbe number difference between said two diffractive element components.

4. The projector optical system according to claim 1, further satisfying the following expression $$(Eg+Ec)/2 > 0.85 \times Ed$$

wherein Ed denotes a diffraction efficiency design value for a main wavelength (d-line) of said diffraction optical surface, Eg denotes a diffraction efficiency design value for a short wavelength (g-line) relative to said main wavelength, and EC denotes a diffraction efficiency design value for a long wavelength (C-line) relative to said main wavelength.

5. The projector optical system according to claim 1, being symmetrical with respect to the optical axis, wherein a principal ray of a largest image height has a light ray angle not greater than 10 degrees when passing through said diffraction optical surface formed in said first lens group, the projector optical system further satisfying the following expression $$0.2 < C/f < 2.0$$

wherein C denotes an effective diameter of said diffraction optical surface, and f denotes a whole-system focal distance.

6. The projector optical system according to claim 1, further satisfying the following expression $$0.02 < h/d < 0.9$$

wherein h denotes a grating height of said diffraction gratings that form said diffraction optical surface, and d denotes a thickness of the diffractive element component having the smaller thickness on the optical axis, among said diffractive element components.

7. The projector optical system according to claim 1, further comprising a final lens group having positive refractive power and arranged on the display element side of said first lens group.

8. The projector optical system according to claim 1, wherein said projector optical system has a polarizing beam splitter.

9. The projector optical system according to claim 8, wherein said polarizing beam splitter is a wire grid polarizing beam splitter.

10. A method for forming a real image by projecting an image of a display element, comprising the step of:
forming said real image using a projector optical system that comprises:
sequentially from a projection side,
an aperture diaphragm; and
a first lens group having positive refractive power and having, in the interior thereof or on a lens surface at a projection side or at a display element side, a diffraction optical surface formed by a multilayer-type diffractive optical element in which diffraction gratings formed on two diffractive element components are arranged facing each other;
the projector optical system satisfying the conditional expression $$0.01 < \Delta Nd < 0.45$$

where $\Delta Nd$ is a difference between refractive indices of said two diffractive element components for a main wavelength (d-line).

11. The method according to claim 10, wherein said real image is formed by using a projector optical system further satisfying the following expression $$0.1 < K/L < 1.5$$

where L is a total length on an optical axis, and K is a distance on the optical axis from said aperture diaphragm to a surface of said first lens group that is closest to the projection side.

* * * * *